July 6, 1965   H. A. WHITE   3,193,088
RECIPROCATING TYPE CONVEYOR
Filed Nov. 23, 1962   5 Sheets-Sheet 1

INVENTOR.
HAROLD A. WHITE
BY
ATTORNEYS

July 6, 1965 H. A. WHITE 3,193,088
RECIPROCATING TYPE CONVEYOR
Filed Nov. 23, 1962 5 Sheets-Sheet 3

INVENTOR.
HAROLD A. WHITE
BY
ATTORNEYS

INVENTOR.
HAROLD A. WHITE
BY Woodhams, Blanchard & Flynn
ATTORNEYS

United States Patent Office 3,193,088
Patented July 6, 1965

3,193,088
RECIPROCATING TYPE CONVEYOR
Harold A. White, 2306 Rambling Road, Kalamazoo, Mich.
Filed Nov. 23, 1962, Ser. No. 239,705
12 Claims. (Cl. 198—219)

This invention relates to conveyor apparatus and it relates more particularly to a reciprocating conveyor having interfingered sections.

While reciprocating conveyors having interfingered sections such that a conveyed solid article is carried on single succeeding sections thereof to effect a movement of said article from one location to another are well known in the art, no conveyor of this type is known, insofar as I am aware, wherein transfer of said article from one section to another takes place when said sections are moving in the same direction. Further, no conveyor is known, insofar as I am aware, wherein said transfer takes place when said sections are moving in the same direction at essentially the same velocity. Such characteristics are essential when the conveyed article is of a relatively fragile nature as are, for example, freshly molded concrete products or glassware, and is to be conveyed without damage. It is easily seen that such relatively fragile articles are easily damaged on known reciprocating conveyors wherein the conveyor sections involved in the transfer are moving in different directions or in the same direction at different speeds wherein said article may be damaged by the shock of virtually instantaneous change in velocity during transfer and/or by friction should the article slide on the transferring sections during transfer.

Other conveyor types such as those of the nonreciprocating type, of which constant velocity, endless belt or chain conveyors are examples, which may be used singly or serially, are known wherein the article transferred is not subject to sudden changes in velocity. However, such types of conveyors are ill adapted for carrying extremely heavy articles (e.g., 500 tons) through areas of high heat while consuming only a low amount of power and not removing appreciable heat from said heating areas.

Accordingly, the objects of this invention include:

(1) To provide a reciprocating conveyor having interfingered sections wherein a solid article is transferred between and carried on a series of single succeeding sections to effect a translocation of said article.

(2) To provide a reciprocating conveyor wherein two adjacent sections of said conveyor travel in the same horizontal direction and at the same speed when the article carried is transferred from one section to the other section whereby the article carried is subjected to no change in horizontal velocity at the point of transfer.

(3) To provide a reciprocating conveyor capable of conveying extremely heavy loads (such as of the order of 500 tons) at low speed with low-power requirements and which is practical to construct and operate in extremely long lengths.

(4) To provide a reciprocating conveyor capable of carrying solid objects of fragile nature without damage.

(5) To provide a reciprocating conveyor wherein the conveyor load-bearing member shall not transfer excessive heat from zones of product processing.

(6) To provide a reciprocating conveyor which is adaptable for conveying in either direction by reversing the direction of rotation of the driving unit.

(7) To provide a reciprocating conveyor which is easily adaptable to use with articles of widely differing size, shape and weight.

(8) To provide a reciprocating conveyor which is relatively easily and inexpensively manufactured and installed and which will require a minimum of maintenance effort and cost.

Other objects and purposes of this invention will be apparent to persons acquainted with devices of this type upon reading the following specification and inspecting the accompanying drawings.

General description

Each of a pair of eccentrics moves a pitman arm attached to a slide. The eccentrics rotate in the same direction and at the same speed but said eccentrics are phased 180 degrees or less apart. Said eccentrics, pitman arms and slides comprise a driving unit for a conveyor unit.

Said conveyor unit consists of a pair of interleaved conveyor sections which alternately support an article to be conveyed substantially horizontally and to each of which is attached a set of identical inclined ramps which are oriented to raise and lower each said section as it reciprocates. The ramps on one section face oppositely of those on the other section. The driving unit so reciprocates the conveyor sections that the conveyor sections are moving in the same direction when the conveyed article is transferred from one section to the other.

A modified driving unit is disclosed whereby each conveyor section is driven by a pressure fluid cylinder, said cylinders each being controlled by an electromechanical system.

Detailed description

In the following description, certain terminology will be used for convenience in reference which will be recognized for convenience only and not as limiting. For example, the terms "rightward" and "leftward" and derivatives thereof will refer to direcitons to the right and left as appearing in the drawings in connection with which such terminology is used. The terms "upward" and "downward" and derivatives thereof will refer to directions with respect to the apparatus in its normal position of use. The terms "inward" and "outward" and derivatives thereof will refer to directions toward and away from the geometric center of the apparatus.

Figure 1:
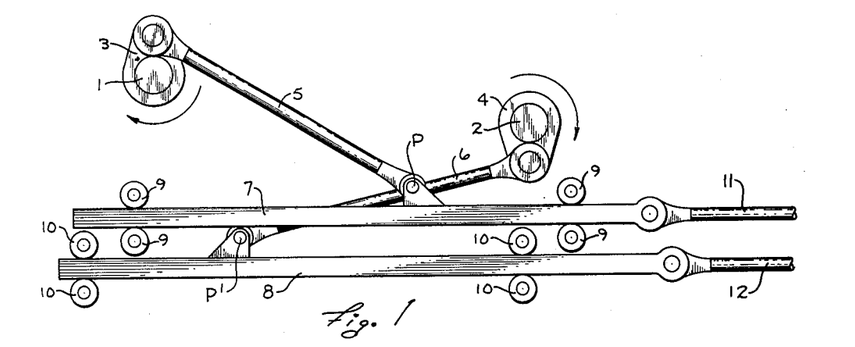
FIGURE 1 is a side elevational view of the driving unit of the apparatus embodying the invention.

FIGURE 1 discloses a pair of power shafts 1 and 2 rotating in the same direction and with the same speed, to which are affixed a pair of identical eccentrics 3 and 4, respectively, said eccentrics here shown as being 180 degress out of phase with respect to each other. Such phasing is shown for purposes of illustration only and it is recognized that phase angles of less than 180 degrees may be used as considered hereinafter. Pitman arms 5 and 6, which are of equal length, are pivotally affixed at one of their respective ends to the eccentrics 3 and 4, respectively. The pitman arms 5 and 6 extend in opposite horizontal directions with respect to each other and are pivotally secured at their other respective ends to slides 7 and 8, respectively, at the points P and P', respectively. The slides 7 and 8 are held for rightward-leftward movement only by any convenient means here shown, such as the rollers 9 and 10, respectively. The power shafts 1 and 2 are here shown for purposes of illustration to be located above the slides 7 and 8. However, it will be noted that said power shafts may be located below said slides or may be located on the same level as the respective slides. In any case, however, said power shafts are preferably at equal perpendicular distances from the line of motion of their respective slides. Should the power shafts 1 and 2 be located on the axes of their respective slides it will be seen hereinafter that the phase angle between eccentrics must be other than 180 degrees or zero degrees apart for an article to be conveyed.

Figures 2, 3:
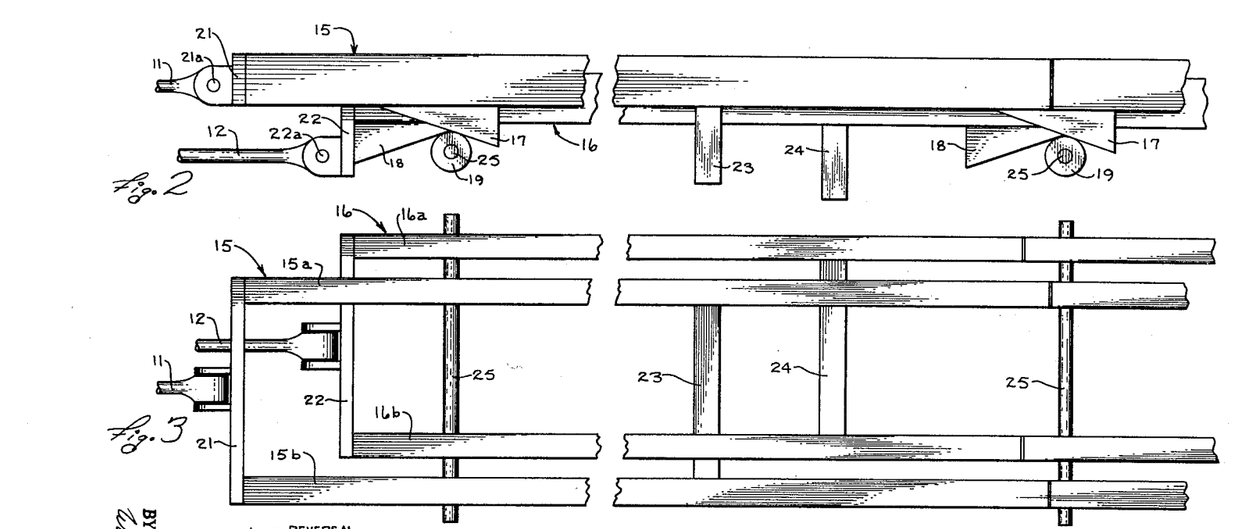
FIGURE 2 is a side elevational view of the conveying unit of the apparatus embodying the invention.
FIGURE 3 is a top view of the conveying unit of the apparatus embodying the invention.

Identical connecting rods 11 and 12 are pivotally connected at their leftward ends to the slides 7 and 8, respectively, and at their rightward ends to the pivot points 21a and 22a, respectively. Said latter points are located on the driven ends 21 and 22, respectively, of conveyor sections 15 and 16, respectively (FIGURE 2). To insure the same amount of motion of the conveyor sections, each slide must be located a vertical distance from the vertical midpoint of its conveyor's travel equal to that of the other slide from its conveyor's vertical midpoint of travel. Said distance will be zero from minimum distortion of conveyor motion by the connecting rods.

The conveyor sections 15 and 16 (FIGURE 3) are preferably of equal length and are shown as consisting of pairs of spaced, parallel, horizontally oriented side rails 15a, 15b and 16a, 16b, respectively. The side rails 15a and 15b are joined at their driven end by the end member 21 and at points along their length by perpendicularly depending U-shaped, upwardly facing, intermediate members, such as the member 23, fixed to the bottom sides thereof. Similarly, the side rails 16a and 16b are preferably joined at their driven end by the end member 22 and at points along their length by U-shaped, upwardly facing, intermediate members such as a member 24 fixed to and depending from the bottom sides thereof. Said end and intermediate members are aligned on the side members of the conveyor sections 15 and 16 so as not to interfere with each other during relative movement of the conveyor sections.

The conveyor section 15 has fixed to its bottom side a series of identical wedge-shaped ramps 17. The conveyor section 16 has fixed to its bottom side a series of wedge-shaped ramps 18 identical to the ramps 17 but oriented oppositely thereto. Said ramps may be so placed on the conveyor sections 15 and 16 as to ride on individual rollers 19 which are rotatable on shafts 25. If desired, the shafts 25 may be made rotatable in outboard bearings not shown and the rollers 19 may be fixed thereto for rotation therewith. Such an arrangement requires that each shaft 25 supports ramps fixed only to one of the conveyor sections for reasons appearing hereinafter. However, the use of outboard bearings may be desired in cases where the conveyor sections are working in areas of extreme heat.

Although the conveyor sections shown in FIGURES 2 and 3 alternately carry the object to be conveyed on the upwardly facing sides thereof, it will be noted that the intermediate members 23 and 24 may be attached to the upper sides of said conveyor sections facing downwardly. Also, the midportion of intermediate bars 23 may have fixed thereto a series of spaced bars which are parallel to the side rails 15a and 15b and which are interleaved with similarly spaced and oriented bars on the intermediate members 24 to form a carrying deck for relatively small objects. Also, several vertically spaced similarly constructed decks may be supported by the conveyor sections 15 and 16 to simultaneously convey several levels of articles.

Figure 13:
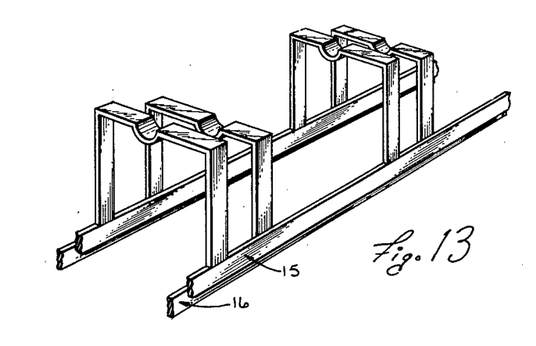
FIGURE 13 is a broken oblique view of a modified conveying unit.

If desired, a long and narrow load, such as steel rods or long paper rolls, may be carried on said intermediate members. In such case, it will often be preferable to invert said intermediate members so that they will extend as inverted U-shapes (FIGURE 13) above the conveyor sections whereby, if appropriate, the bight portions thereof may be shaped to conform to the load.

*Operation*

Figures 4, 5:
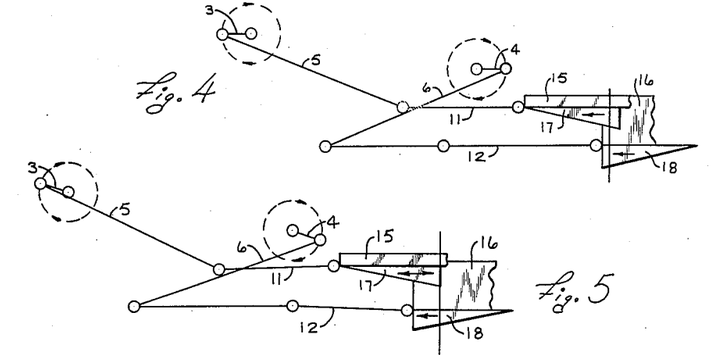
FIGURE 4 is a diagrammatic view disclosing elements of the apparatus.
FIGURE 5 is a diagrammatic view of the apparatus showing elements thereof in a different position.

Assuming that the eccentrics 3 and 4 are horizontally oriented, are in phase opposition, are rotating in a clockwise direction and are positioned as shown in FIGURE 4 and further assuming that the conveyor sections are of equal vertical span, the load-carrying surfaces of the conveyor sections will be at the same height. Therefore, both conveyor sections will be supporting the conveyed article. Since the ramp 18 is travelling leftwardly, the conveyor section 16 has a downward component of motion and since the ramp 17 is oppositely oriented and is also travelling leftwardly the conveyor section 15 has an upward component of motion. Therefore, the article conveyed is being transferred from the conveyor section 16 to the conveyor section 15 and said article continues its leftward motion throughout this transfer.

It will also be noted in connection with FIGURE 4 that the connecting rods 11 and 12 and ramps 17 and 18, and therefore the conveyor sections 15 and 16, have equal horizontal velocity components at the point of transfer.

That the horizontal components of velocity of the conveyor sections 15 and 16 are equal follows from the following conditions:

(1) The eccentrics are of equal radius and have the same speed and direction of rotation. The radii of offset of the eccentrics are directed oppositely. Therefore, the driving pivots of the eccentrics 3 and 4 have equal and oppositely directed tangential velocities.

(2) The power shafts 1 and 2 are both above and at equal perpendicular distances from the slides 7 and 8, respectively. The axes of the eccentrics 3 and 4 are parallel to each other and to the slides 7 and 8. The pitman arms 5 and 6 are of equal length and therefore subtend supplementary angles with the slides 7 and 8, respectively. Therefore, the pitman arms 5 and 6 subtend supplementary angles with vectors defining the trangential velocities of the driving pivots of the eccentrics 3 and 4, respectively. Therefore, the axial velocities of the pitman arms 5 and 6, being cosine functions of said last-named supplementary angles, are equal in magnitude. The horizontal velocity of the remaining pivot points P and P' of the slides 7 and 8, respectively (FIGURE 1), and thus of the conveyor sections 15 and 16 are therefore equal in magnitude and direction and are cosine functions of the equal acute angles defined by the pitman arm 5 and the slide 7, and the pitman arm 6 and the slide 8. Therefore, there is no change in the horizontal velocity of the conveyed article at the point of transfer.

It will also be noted at the point of transfer, as illustrated in FIGURE 4, the axial velocity of the pitman arms 5 and 6 is small compared to the tangential velocity of the driving pivots of the eccentrics 3 and 4 because the cosine function relating said tangential and axial velocities is small at the transfer point. Therefore, the horizontal component of velocity of the conveyor sections 15 and 16 is relatively small at the transfer point as compared with other points in their travel.

It will be seen that there is a change in direction of the vertical component of velocity of the conveyed article at the transfer point. Since the vertical movement of the conveyor sections is small as compared with the horizontal movement thereof, the vertical component of velocity of the conveyor sections is at all times small compared with the horizontal component of velocity thereof, the change in the vertical component of the velocity of the article conveyed will be small compared with its horizontal velocity at the point of transfer. Therefore, the shock due to velocity change entertained by the conveyed article will be minimal, if any. Moreover, the slope of the ramps and various parameters of the driving unit may be changed by design to change the vertical acceleration undergone at transfer.

FIGURE 5 shows the orientation of the components of the apparatus embodying the invention at a point in time shortly after the transfer point. More precisely, FIGURE 5 discloses the point in time at which the conveyor section 15 (with the ramp 17, now carrying the conveyed article), reverses its direction and proceeds rightwardly as indicated. It will be noted that the axial velocity of the pitman arm 5 and therefore the speed of the load-bearing conveyor section 15 drops relatively slowly as the reversal point is reached, goes to zero at the reversal point and picks up slowly in the opposite direction as the reversal point is passed. Therefore, acceleration and deceleration of the conveyed article is gradual and shock resulting therefrom is minimized. At this point, the conveyor section 16, with the ramp 18, still continues its leftward motion and therefore the two conveyor sections are now moving in opposite directions. Said oppositely directed motion will not affect the conveyed article for which the conveyor was designed because of the difference in the height of the conveyor sections 15 and 16 caused by the operation of the ramps 17 and 18. Continued rotation of the eccentrics brings about a reversal of the conveyor section 16 with the ramp 18. At the desired point of the sequence, both of the conveyor sections are moving rightwardly at the same height and horizontal velocity and the conveyed article is returned from the conveyor 15 to the conveyor 16. As the sequence continues, the conveyor section 15 reverses to travel leftwardly and the load-carrying conveyor 16 continues rightwardly. Toward the end of the sequence, the conveyor 16 also reverses to travel leftwardly and very shortly thereafter the sequence repeats.

Figure 6:
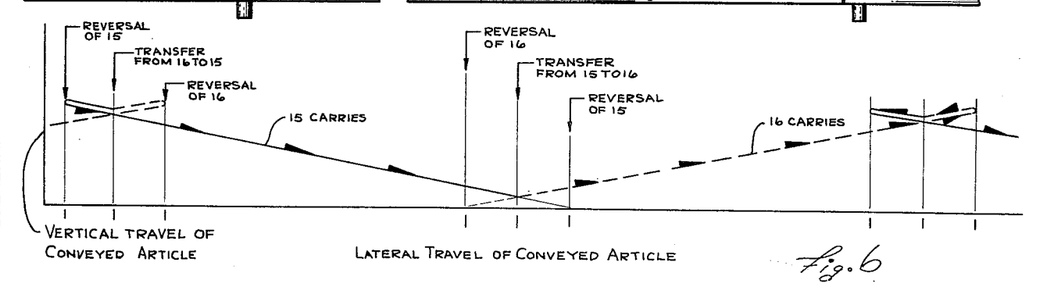
FIGURE 6 is a diagrammatic view disclosing the locus of a point on an article being carried on a specific embodiment of the invention.

FIGURE 6 discloses the locus described by a point on the conveyed article as it is taken from the transfer point illustrated by FIGURE 4 through several cycles of operation. Said locus is indicated here by a solid line when said article rides on the conveyor section 15 and is indicated here by a dotted line when said article rides on the conveyor section 16. It will be understood that the locus of the point on the conveyed object between transfers will be a straight line and that the locus of FIGURE 6 deviates from the straight line only to clearly disclose the motion at points through which the conveyed article passes more than once. It is thus seen that the article conveyed, upon being transferred to conveyor section 15, travels upwardly and leftwardly to a reversal point and then reverses its motion and travels downwardly and rightwardly through the location of transfer and therebeyond to a point where it is transferred to the conveyor section 16 at which point it continues its rightward motion but now moves upwardly rather than downwardly. Such motion continues until the conveyor section 16 reverses to travel downwardly and leftwardly to the transfer point whereat the article conveyed is transferred once again to the conveyor section 15 at which point motion continues as described hereinabove.

It is fully contemplated that the eccentrics may be oriented at less than 180 degrees phase difference. A phase angle of less than 180 degrees will result in less net motion of the conveyed article per sequence but will increase the height differential between the conveyor segments at points where the conveyor sections cease to travel the same direction.

Figure 7:
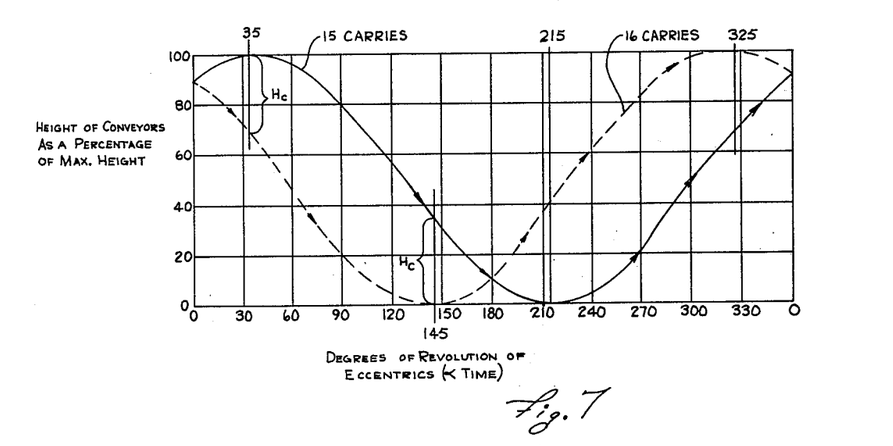
FIGURE 7 is a plot of the vertical displacement of two conveyor sections against a parameter proportional to elapsed time.

Referring now to FIGURE 7 it will be noted that the abscissa of this graph is calibrated in degrees of revolution of the eccentrics which is proportional to the elapsed time of operation of the apparatus. It is therefore seen that this graph portrays the difference in the heights of the two conveying sections at any point in a cycle of the conveying apparatus. It will be further noted that the absolute value of the slope of either of the plots is proportional to the vertical component of velocity of the conveyor section to which it applies. Said plots are sine waves. The vertical velocities of the conveyor sections at a point of transfer are small relative to the maximum vertical velocities attained thereby. The phase displacement of said sine waves is a function of the parameters of the driving unit.

The differential in the heights of the load surfaces of the conveyor sections is labeled at the reversal points as $H_c$. It will be noted that the differential in height between said conveyors is greatest between said reversal points wherein the area between reversal points does not include a transfer point and that the minimum height differential between the conveyor sections when said sections are moving in opposite directions occur at the reversal points. Therefore, when conveying articles having significant surface roughness, the differential $H_c$ should be greater than the surface roughness of the conveyed article for proper operation of the conveyor unit.

Finally, FIGURE 7 indicates the accelerations and decelerations, both vertical and horizontal, which the article will undergo as it is being conveyed.

In cases where it is desired that the power shafts 1 and 2 be placed in the horizontal plane of the slide pivots P and P', it is easily seen from FIGURE 7 that for 180 degrees or zero degrees phase differences between eccentrics, that the sine waves portraying conveyor motion will be likewise either in phase opposition or in phase. The effect of either state will be that the conveyed article will have no net horizontal movement and will therefore not be conveyed to its destination. Therefore, when the power shafts 1 and 2 are so located, the eccentrics must be phased at some angle other than 180 degrees or zero degrees. The phase angle selected would be equal to that between the sine waves on a plot of the same parameters as FIGURE 7. It should also be noted in connection with this power shaft placement and only therewith, that a direct connection of the eccentrics 3 and 4 to the connecting rods 11 and 12, respectively, with the consequent elimination of the pitman arms 5 and 6 and the slides 7 and 8, is possible. The sine wave character of the conveyor motion will be least disturbed by this change if the connecting rods 11 and 12 are long with respect to the eccentric radius and the conveyor ramp rise employed therewith.

In other words, the dephasing of conveyor sections 15 and 16 which is necessary to make the conveyed article advance toward its destination may be brought about either by dephasing the eccentrics 3 and 4 or by vertically offsetting the power shafts 1 and 2 from the line of motion of the pivot points P and P', respectively.

*Modification*

Figure 8:
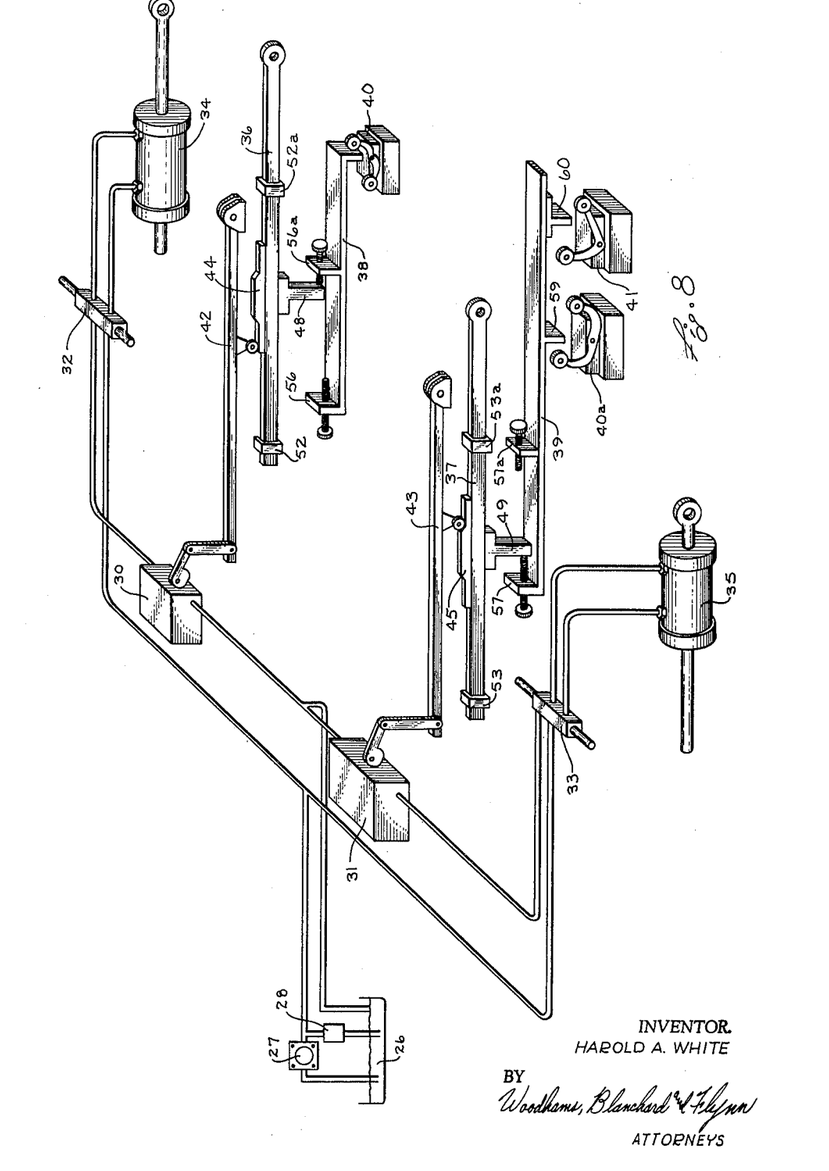
FIGURE 8 is a perspective view of a modified driving unit of the apparatus embodying the invention.

FIGURE 8 discloses a driving unit in which the conveyor sections are driven by hydraulic means, said hydraulic means being controlled by a mechanical and electrical control system. A fluid reservoir 26 is provided for holding a quantity of pressure fluid which may be of any convenient non-compressible type which is fed by a pump 27 to a pair of flow-reversing valves 32 and 33. A pressure relief valve 28 may be provided in the line after said pump to prevent overpressurizing of the apparatus. The valves 32 and 33, which are preferably three-position, four-way valves, control the flow of pressure fluid to and from two pressure fluid cylinders 34 and 35, respectively, and enable the direction of motion of the piston rods to said cylinders to be reversed. In their third position, the valves 32 and 33 cut off the flow of pressure fluid to the pressure fluid cylinders. The pressure fluid cylinders 34 and 35 exhaust through the reversing valves 32 and 33, respectively, and through flow regulator valves 30 and 31, respectively, which are capable of restricting to any desired degree the flow through the cylinders 34 and 35, respectively, and into the reservoir 26. The reversing valve 32, the hydraulic cylinder 34 and the flow regulator valve 30 are preferably identical with their counterparts 33, 35 and 31. The hydraulic cylinders preferably have constant internal volume-per-unit length to the left of and to the right of the piston therein. This effect may be achieved by use of a dummy piston rod extending leftwardly from the piston through the leftward wall of each hydraulic cylinder which dummy rod is identical to the working piston rod extending through the rightward wall of said cylinder. The driving piston rods of the hydraulic cylinders 34 and 35 are attachable, directly or indirectly as desired and in any convenient manner, to the conveyor sections 16 and 15, respectively.

The mechanical part of the system controlling the hydraulic driving unit includes control bars 36 and 37 which are connected, directly or indirectly and in any convenient manner, at their rightward ends to the conveyor sections 16 and 15, respectively, in any convenient manner. The control bars 36 and 37 are restrained to move only horizontally by any convenient means such as the supports 52, 52a, and 53, 53a, respectively. The control bar 36 carries a profile cam 44 and an actuator block 48. Said cam and block are preferably located on the upper and lower surfaces, respectively, of said control bar. The control bar 37 is similarly equipped with a profile cam 45 and an actuator block 49.

A control lever 42 pivotally mounted above the control bar 36 has means such as a roller attached thereto for riding the ramp surfaces of the profile cam 44 whereby said control lever is caused to pivot about its rightward end. The leftward end of said control lever is connected by any convenient means to the flow regulator valve 30 whereby pivotal movement of the control lever 42 will cause adjustment in the rate of fluid flow through the valve 30. A preferably identical control lever 43 is similarly mounted above the control bar 37 for riding the profile cam 45 and is connected to the flow regulator valve 31 for controlling the rate of fluid flow therethrough.

A shipper bar 38, supported by means not shown for horizontal movement, with a pair of spaced adjustable stop members 56 and 56a attached thereto which are capable of actuation by the actuator block 48 of the control bar 36 to effect movement of said shipper bar. The shipper bar 38 at the rightward end of its travel actuates a limit switch 40 and at the leftward end of its travel returns said limit switch for purposes appearing hereinafter. A shipper bar 39 with spaced adjustable stop members 57 and 57a attached thereto is confined for horizontal movement by means not shown and is actuated through said stop members by the actuator block 49 of said control bar 37. Blocks 59 and 60 are affixed to the shipper bar 39. The block 59 actuates a double-throw limit switch 40a after completion of a predetermined percentage of the stroke of the control bar 37 to provide current through the limit switch 40 (FIGURE 8) as discussed hereinabove. The block 60 may be suitably adjusted lengthwise of the shipper bar 39 so that it actuates a double-throw limit switch 41 at the end of the rightward or leftward stroke of the control bar 37 for purposes appearing hereinafter. The switch 41 preferably includes a time delay device, preferably adjustable, whereby the electrical response of the switch lags the initiation of its mechanical actuation by a preselected time interval.

Figure 10:
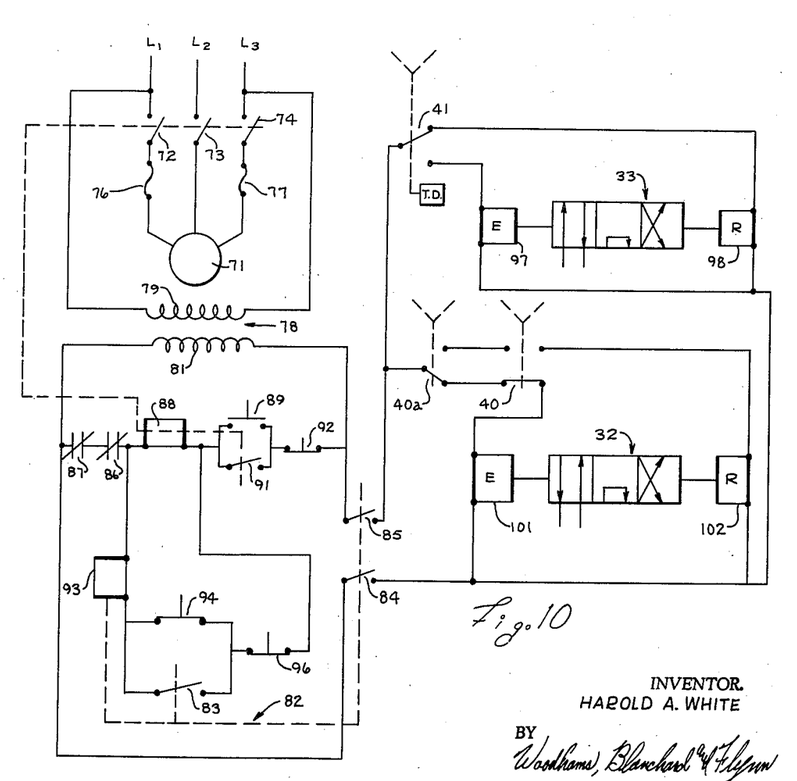
FIGURE 10 is a schematic view disclosing control circuitry for the apparatus of FIGURE 6.

FIGURE 10 discloses electrical circuitry for controlling the hydraulic drive unit of FIGURE 8. A three-pole motor 71 is connectable to power lines $L_1$, $L_2$ and $L_3$ through contacts 72, 73 and 74 of a four-pole, single-throw contactor block. The motor lines from contacts 72 and 74 are protected from overload by protective devices 76 and 77 respectively. The power lines $L_1$ and $L_3$ are also connected to primary winding 79 of transformer 78. A secondary winding 81 of said transformer has connected across it a series circuit comprised of: a pair of overload-protecting disconnect switches 86 and 87; a winding 88 of a motor control relay; a parallel circuit consisting of a normally open, single-pole, single-throw start switch 89 and a single-pole, single-throw contactor switch 91 comprising the fourth contact of the above-mentioned four-contactor block; and a normally closed, single-pole, single-throw stop switch 92. The motor control relay winding 88 has connected in parallel with it a series circuit comprised of: the control relay winding 93 of a control relay 82; a parallel circuit consisting of a relay start switch (single-pole, single-throw, normally open) and a single-pole, single-throw contact 83 actuable by said winding 93; and a single-pole, single-throw, normally closed relay stop switch 96. In addition to the above-mentioned circuitry, the secondary winding 81 also has connected to one side of it a contact 84 and to the other side of it a contact 85 which are actuatable by means of the control relay winding 93. The contactor 85 connects to the input of the limit switch 41 hereinabove discussed in connection with FIGURE 8. The limit switch 41 is a single-pole, double-throw switch with adjustable time delay means T.D. built into it to slow down its switching. By means of the limit switch 41, the contact 85 may be connected through either of two solenoids 97 and 98 to the contact 84 of the control relay 82. The solenoids 97 and 98 act to adjust the flow-reversing valve 33 for straight-through flow or reverse flow whereby the hydraulic cylinder 35 is made to push or pull, respectively, the conveyor section 15.

The contact 85 is also connected to the input of the limit switch 40a which functions as a single-pole, double-throw switch. Each of the two outputs of the limit switch 40a is connected to a separate input of the limit switch 40. The limit switch 40 is functionally a pair of single-pole, single-throw switches mechanically interconnected so that when one is on, the other is off and vice versa. The two outputs of the limit switch 40 are connected through the solenoids 101 and 102, respectively, to the contact 84 of the control relay 82. The solenoids 101 and 102 control the position of the reversing valve 32 whereby the hydraulic cylinder 34 is made to either push or pull the conveyor section 16.

*Operation of hydraulic drive unit*

In considering the operation of the hydraulic control unit, assume that conveyor sections 15 and 16 have a phase difference other than zero degrees or 180 degrees for it will be obvious that a zero degree or 180 degree phase difference would result in no net movement of the article conveyed. Assume further, for purposes of illustration only and not to be taken as limiting, that the difference in positions of the conveyors 15 and 16 will be 80 percent of a stroke and that the conveyor 15 will lead the conveyor section 16. Therefore, when the hydraulic cylinder 34 is at 100 percent of stroke (fully extended), the hydraulic cylinder 35 will be at the 20 percent point away from its fully returned position.

The apparatus is started by pushing the motor start switch 89 (FIGURE 10) which closes the circuit including the secondary winding 81 of the transformer 78, the overload protectors 87 and 86, the motor relay winding 88, and the normally closed stop switch 92. Thus, current flows through the motor relay winding 88 which then closes the contacts 72, 73, 74 and 91 mechanically. Closure of the contacts 72, 73 and 74 allows current flow from the power lines $L_1$, $L_2$ and $L_3$ to the motor 71 and closure of the contact 91 maintains said series circuit and thus operation of the motor 71 after the release of the motor start button 89. A relay start switch 94 is depressed momentarily whereby current flows through the winding 93 of the control relay 82, through said start switch, through the normally closed stop switch 96 and back to the motor start circuit. Current flow through the relay winding 93 activates same to close the contacts 83, 84 and 85. Closure of contact 83 allows current to continue to flow through the relay winding 93 when the relay start switch 94 is released. Closure of the contacts 84 and 85 allows current to flow through the limit switch 41 to one of the solenoids 97 and 98 and through the limit switches 40a and 40 to one of the solenoids 101 and 102, therefore activating in a straight-through or reverse-flow mode the reversing valves 33 and 32. Activation of said valve allows pressure fluid flow to the hydraulic cylinders 35 and 34, respectively.

Activation of the motor 71 starts the pressure fluid pump 27 connected thereto thereby applying fluid pressure to the reversing valves 32 and 33 and thus to the hydraulic cylinders 34 and 35, respectively. Assuming the piston rod of the hydraulic cylinder 34 to be almost fully extended and the piston rod of the hydraulic cylinder 35 to be approaching the twenty percent point of being fully returned, parts of the hydraulic drive unit will be located as shown in FIGURE 8 and at the same time the contacts of the limit switches 40, 40a and 41 will be positioned as shown in FIGURE 10. Furthermore, the graph of FIGURE 11 starts at this point. The control lever 42 will be in contact with the leftward flat portion of the profile cam 44 whereby the flow regulator valve 30 is held in a constant position to restrict fluid flow from the cylinder 34 whereby the velocity of the piston rod of the cylinder 34 is maintained at a constant low velocity. The actuator bar 48 on the control bar 36 is approaching its rightwardmost position and is about to move the shipper bar 38 rightwardly to actuate the limit switch 40. Such actuation will cut off the current to the solenoid 101 and will set the switch 40 to provide current to the solenoid 102 when the rest of the circuit closes.

As the piston rod of the cylinder 35 approaches a point twenty percent away from its full retracted position, the control lever 43 will move off the sloped portion of the profile cam 45 onto the flat portion thereof whereby the flow regulator valve 31 will be adjusted to restrict the flow of hydraulic fluid from the cylinder 35 to maintain the piston rod of the cylinder 35 at a constant low velocity. At this point also the actuator block 49 on the control bar 37 moves the shipper bar 39 leftwardly to actuate the limit switch 40a to provide current to the limit switch 40 so that the flow-reversing valve 32 will be moved to a position wherein the flow of the cylinder 34 is reversed so that the piston rod thereof will retreat.

Figure 11:
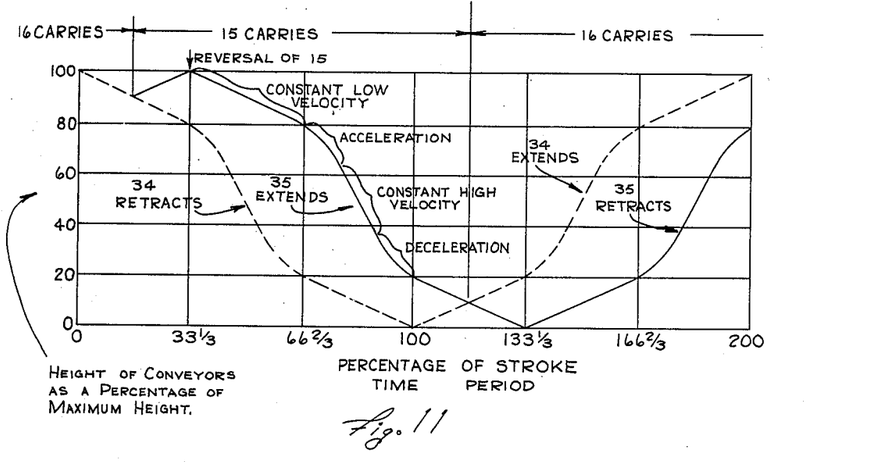
FIGURE 11 is a plot of vertical displacement of two conveyor sections with respect to a time-proportional parameter.

After reversal, the piston rod of cylinder 34 retreats at a constant low velocity through a point where the level of the conveyor 16 will be equal to the level of the conveyor 15 whereby the article conveyed will be transferred from the conveyor section 16 to the conveyor section 15 as indicated on the graph of FIGURE 11. Transfer occurs when the cylinder 34 has retracted ten percent of its travel from its reversal point and when the cylinder 35 is ten percent away from being fully retracted. When transfer occurs, both conveyor sections are moving leftwardly with the same horizontal velocity.

As the cylinder 35 reaches full retraction, movement of the shipper bar 39 actuates the switch 41 which after a preselected time delay which may vary from ½ to 1½ seconds or from about one percent to about three percent of the stroke, allows current to flow into the solenoid 97 whereby the flow of pressure fluid in the cylinder 35 reverses and the piston rod of the pressure fluid cylinder 35 begins to extend at constant low velocity. During the period of the time delay, the piston of the cylinder 35 remains at rest in its retracted position. The reason for said time delay will appear hereafter but it will be apparent that because of said time delay the piston rod of the cylinder 34 will now be led by the piston rod of the cylinder 35 by somewhat less than the eighty percent of stroke referred to hereinabove.

Figure 9:
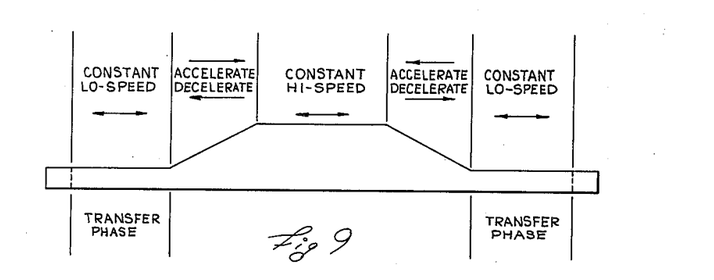
FIGURE 9 is a side elevational view of a part used in the apparatus of FIGURE 8.

As the piston rod of the cylinder 34 reaches the twenty percent point of its retraction stroke, the extension of the control lever 42 bearing on the profile cam 44 will encounter an upward slope thereon thus adjusting the flow regulator valve 30 to increase the velocity of cylinder 34. Referring to FIGURES 9 and 11, it will be noted that the acceleration undergone will be proportional to the slope of the profile cam and that the velocity achieved after the acceleration stage will depend on said slope and also upon lateral extent of said slope. As motion continues, the control lever 42 reaches and rides on the high plateau of the profile cam 44, the regulator valve 38 is held at a constant opening, and the piston rod of the hydraulic cylinder 34 travels at a constant high velocity of retraction. After a suitable period the control lever 42 encounters the downward slope on the profile cam 44 and the consequent actuation of the regulator valve 30 causes the piston rod of the hydraulic cylinder 34 to decelerate to a constant low velocity until the cylinder 34 is fully retracted at which time the limit switch 40 is reset by leftward motion of the shipper bar 38 in the manner above described. During the above-mentioned period of low constant velocity of retraction after cylinder 34, the extending cylinder 35 undergoes a period of acceleration, a period of constant high velocity, and a period of deceleration which are controlled by the profile cam 45. The profile cam 45 is preferably identical to the profile cam 44.

As the extending cylinder 35 reaches the 80 percent point in its extension the shipper bar 39 is actuated by the control bar 37 to reset the switch 40a thereby applying current to the proper pole of the limit switch 40 whereby the solenoid 101 is actuated to reverse the reversing valve 32 and thereby commence extension of the cylinder 34. Because of the time delay of the switch 41 mentioned hereinabove, the cylinder 34 will have reached the retracted limit of its travel and thereby will have actuated the limit switch 40 a fraction of a second before the limit switch 40a is actuated thereby maintaining the synchronism of the two cylinders. The cylinder 34 after reversal begins extension at a constant low velocity governed by the profile cam 44 in a manner above described. At a point where the cylinder 35 will have extended to within ten percent of the limit of its extension stroke and where the cylinder 34 will have extended ten percent of its extension stroke, the respective conveyor sections attached thereto will be travelling in the same direction at the same horizontal velocity and will be at the same level whereby transfer of the conveyed article takes place from the conveyor section 15 to the conveyor section 16. At a point approximately ten percent of a stroke after said transfer point, the cylinder 34 commences an acceleration, constant high velocity, and deceleration phase and the parts associated with cylinder 35 actuate the limit switch 41. Following a timed delay which may be accomplished by conventional means the valve 33 is actuated and the cylinder 35 reversed, thus assuring actuation of the limit switch 40 before the limit switch 40a when the cylinder 34 comes to retraction-extension reversal and when the cylinder 35 has completed eighty percent of its retraction. Maintenance of synchronism between the cylinders 34 and 35 is thereby assured. In retracting, the cylinder 35 goes through the constant low velocity, acceleration, constant high velocity, deceleration, and constant low velocity phases as above discussed in connection with the extension of said cylinder. Meanwhile reversal of the cylinder 34 to retraction occurs, whereafter transfer of the conveyed article from the conveyor section 16 to the conveyor section 15 takes place and the cycle continues as hereinabove discussed.

The driving speed of the drive unit may be controlled by adjustment of the displacement of the pump 27 or by adjustment of the relief valve 28. Conveying action may be stopped at any time by actuation of the relay stop switch 96 (FIGURE 7) and the whole apparatus may be disconnected electrically and stopped by actuating the motor stop switch 92.

It will be noted from the foregoing description that each cylinder piston is stopped each time it completes a stroke. These stops are quite essential in keeping the assembly movements in timed order and to prevent surges from a too rapid reversal of hydraulic flow. The time lost in such stops is regained in the constant high-speed portion of the travel of each of the cylinders which is allowed by the contour of the profile cams 44 and 45. FIGURE 9 illustrates a typical profile cam configuration in which the low and high-speed portions of the travel of the cylinders are maintained at constant velocity where the acceleration and deceleration of the cylinder units is constant. The profile cam is preferably longitudinally symmetrical but may, however, be of proportions other than those shown in FIGURE 9. Furthermore, the acceleration and deceleration rates may be other than constant. The profile cam preferably is of length equal to the stroke length plus an added increment to accommodate the follower attached to the control lever. The length of transfer phase and therefore the length of the constant low-speed portions of the profile cam is determined by the surface roughness of the objects being conveyed and is therefore also a function of the slope of the inclines as has been described above in connection with the mechanically driven conveyor system. The length of acceleration and deceleration phases is determined by the stability and fragility of the conveyed object. The length and elevation of the constant high-speed portion of the profile cam is determined by the constant low-speed and acceleration and deceleration portions of said cam.

It will be noted that through modification of the profile cam from the example shown in FIGURE 9, the character of the motion of the conveyor sections can be tailored as desired. For example, through judicious modification of the profile cams, the hydraulic drive unit can duplicate the motion of the mechanical drive unit discussed above with only the exception of the stroke end pauses required to maintain synchronism of the cylinders 34 and 35. Such pauses, however, may be made very short compared to the total stroke time and may therefore be considered negligible.

Figure 12:
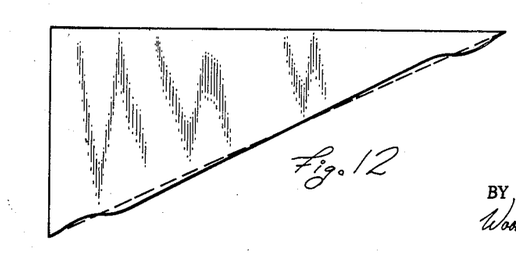
FIGURE 12 is a side view of a modified ramp construction.

It will also be noted in connection with both drive units that the motion of the conveyors may be changed by substitution of ramps with curvilinear surfaces for the constant slope ramps 17 and 18 shown in FIGURE 2. Such modified ramps (FIGURE 12) may be so contoured, for example, as to allow the vertical velocity of the conveyor sections to approach zero at transfer points and/or to provide larger vertical clearances between conveyor surfaces at reversal points. It is also recognized, however, that an increase in slope at any point on the ramp surface will increase the stress on the driving unit.

Although particular preferred embodiments of the invention have been described above in detail for illustrative purposes, it will be recognized that variations or modifications of such disclosure, which lie within the scope of the appended claims, are fully contemplated.

What is claimed is:

1. In a conveyor, the combination comprising:
   a pair of load-supporting members interleaved with each other for alternate support of a load;
   substantially continuously energizable driving means for substantially continuously, reciprocably driving each of said members;
   similarly contoured, oppositely facing, ramps respectively arranged on each of said members;
   means supporting said ramps whereby reciprocation of said members will cause same to move both vertically and horizontally, said driving means being arranged to effect said reciprocation of said members at a phase relationship with respect to each other of less than 180 degrees and greater than zero degrees;
   whereby said load will be transferred from one member to the other while said members are both travelling in the same direction.

2. The device defined in claim 1 wherein said means includes a hydraulic system, said hydraulic system including a cam-operated valve for each of said load-engaging members wherein the shape of said cams determines the speed and direction pattern of reciprocation of each of said load-engaging members.

3. The device defined in claim 1 including opposed ramps for movably supporting said members for said inclined movement; and wherein the load-bearing surfaces of said members are vertically spaced from each other by a greater distance when said members are moving in opposite horizontal directions than when said members are moving in the same horizontal direction.

4. The device defined in claim 1 wherein said driving means include a pair of oppositely phased eccentrics rotating at a constant and equal angular velocity; and including a pair of pitman arms and means for connecting said pair of pitman arms each between a corresponding one of said eccentrics and a corresponding one of said members whereby rotation of said eccentrics effects reciprocation of said members.

5. The device defined in claim 1 wherein each of said ramps has a slope approaching zero at points thereon which bear on its respective one of said ramp supporting means when said load is being transferred from one member to the other and has greater slopes at other points thereon whereby the rate of change of the vertical component of velocity of said load at a point of transfer approaches zero for finite horizontal velocity components of said load.

6. A conveyor according to claim 1 wherein said driving means comprises:
   a pair of eccentrics and means for rotatably driving same at equal speeds and at said phase relationship;
   a pair of pitman arms pivotally connected to said eccentrics at one end thereof;
   means pivotally connecting the other ends of said pitman arms to said members whereby rotation of said eccentrics moves said members.

7. Conveyor means according to claim 1 wherein said driving means comprises:
   a pair of eccentrics of identical radius having parallel axes of rotation and means rotatably driving same at equal speeds;
   a pair of pitman arms pivotally connected to said eccentrics at one end thereof and having equal pivot separations;
   means pivotally connecting the other ends of said pitman arms to said members, said connecting means including means for maintaining the travel of said other end of said pitman arms along straight parallel paths and said connecting means further including connecting rods for pivotally connecting said other ends of said pitman arms to corresponding ones of said members, said axes of rotation of said eccentrics being at equal perpendicular distances from corresponding ones of said straight paths;
   whereby said driving mechanism imparts simple harmonic motion of equal length to each of said members.

8. The mechanism defined in claim 7 wherein:
   said axes of rotation of said eccentrics are located at a nonzero distance from said straight parallel paths and said eccentrics are located 180 degrees out-of-phase and are rotatable in the same direction;
   whereby the phase difference in the motion of said members is a function of the magnitude of said nonzero distance and is different than 180 degrees.

9. In a conveyor, the combination comprising:

interleaved first and second reciprocable members capable of advancing a load by alternate contact therewith;

a pressure fluid source;

first and second pressure fluid cylinders and a reversing valve for connecting each thereof to said source at one end thereof and restricting valves connected to the other ends of said pressure fluid cylinders through said reversing valves, said pressure fluid cylinders having a part thereof connected to respective ones of said members for causing motion thereof;

first and second reciprocably mounted arms and means for connecting said first and second arms to said first and second members, respectively, for being reciprocated thereby;

a profile cam mounted on each of said arms and follower means mounted for contacting said profile cams and connected to said restricting valves for adjusting the opening thereof in a predetermined relation with the contour of said cams;

switch means and means for actuating same due to reciprocation of said arms;

means actuable by said switch means for reversing said reversing valves;

whereby the movement of said members is reversed at each end of each pressure fluid cylinder stroke;

similarly contoured, oppositely facing, ramps respectively arranged on each of said interleaved members and means supporting the ramps whereby reciprocation of said members causes same to move both vertically and horizontally.

10. The device defined in claim 9 wherein:

said switch means actuable by said first arm comprises a first switch located for actuation at each end of the stroke of said first arm to reverse that one of said reversing valves associated therewith;

said switch means actuable by said second arm includes a second switch located for actuation at a point spaced from each end of each stroke of said second arm, and circuitry for connecting said second switch for preventing said first switch from effecting said reversal of said reversing valve associated therewith until actuation of said second switch has occurred;

whereby reversal of said first member is prevented until said second member has passed a preselected intermediate point in its stroke.

11. The device defined in claim 10 wherein:

said switch means actuable by said second arm includes a third switch located for actuation at each end of the stroke of said second arm to reverse that one of said reversing valves associated therewith; and time delay means interposed between said third switch and said associated reversing valve to delay reversing of said reversing valve for a fraction of the time required for said second member to go through a stroke;

whereby said first member will reach the end of the stroke thereof before said second member reaches said preselected intermediate point.

12. The device defined in claim 9 wherein:

said profile cams each include end portions of relatively low height and a mid-portion of increased height, said end and mid-portions being connected by sloped portions;

said follower means comprises a linear transfer device for opening said restricting valves as the height of said cams increases;

whereby said members move at a low speed when said follower means contact end portions on said profile cams, move at a high speed when said follower means contacts the mid-portion of said profile cams and accelerate or decelerate when said follower means is on said sloped portions.

References Cited by the Examiner

UNITED STATES PATENTS

| | | | |
|---|---|---|---|
| 1,386,505 | 8/21 | Jacobsen | 74—26 |
| 1,519,293 | 12/24 | Clark | 74—26 |
| 1,686,696 | 10/28 | Hirschmann | 198—219 |
| 1,814,683 | 7/31 | Fulmer | 198—219 |
| 2,305,212 | 12/42 | White | 198—219 |
| 2,834,454 | 5/58 | Sambraus | 198—224 |
| 2,973,856 | 3/62 | Brooks | 198—219 |

SAMUEL F. COLEMAN, *Primary Examiner.*

WILLIAM B. LA BORDE, ERNEST A. FALLER, JR., *Examiners.*